Nov. 1, 1966 J. D. WEIR 3,282,110
PRESSURE RESPONSIVE DEVICE
Filed Nov. 29, 1961
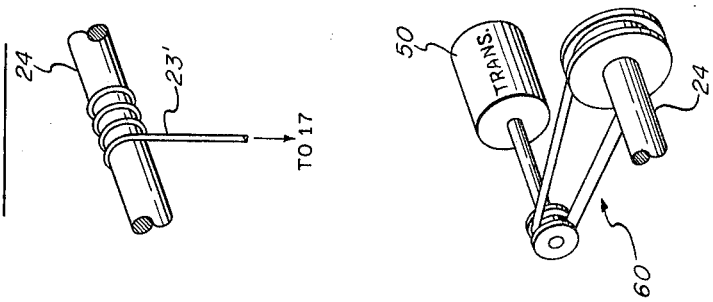
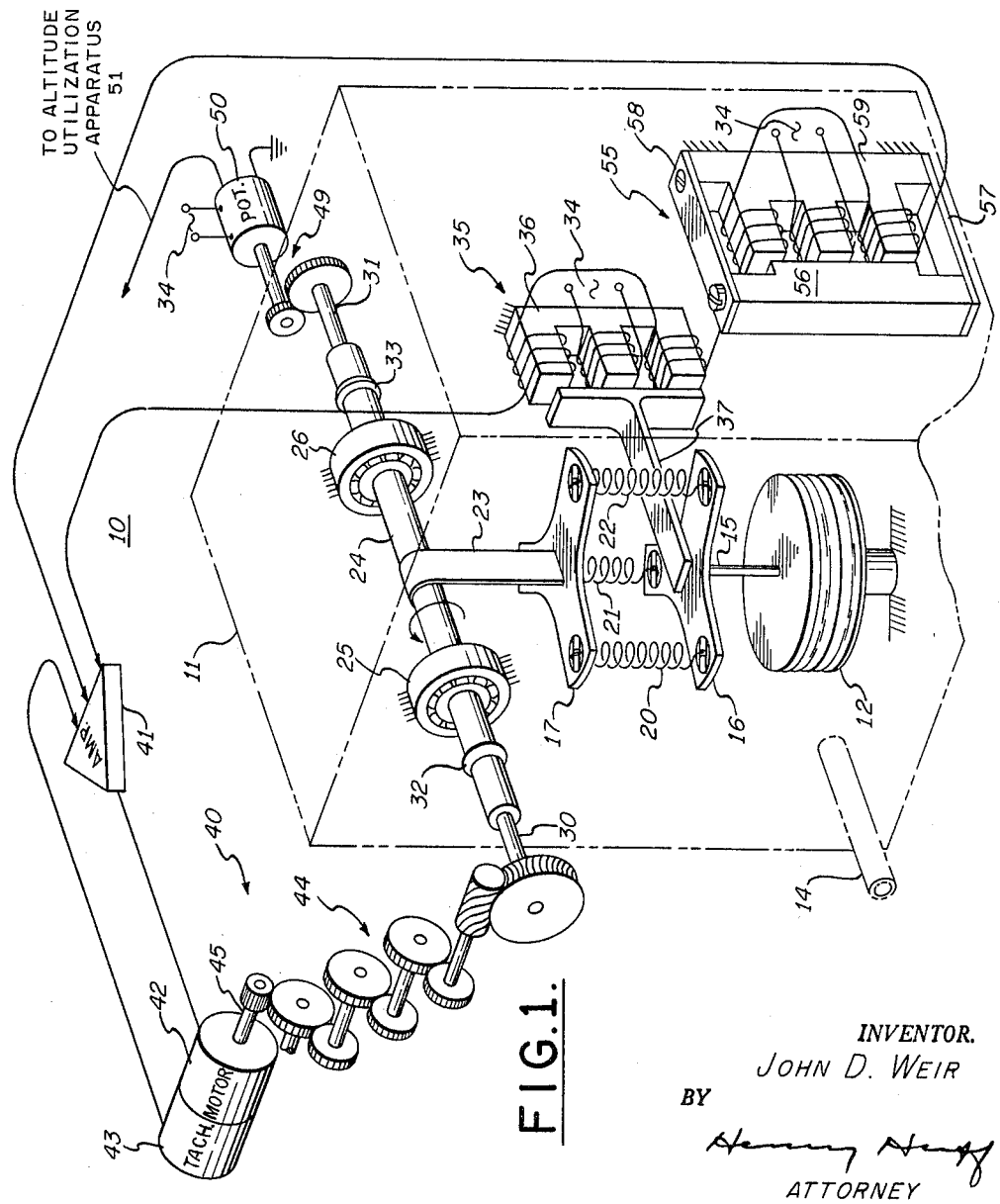
INVENTOR.
JOHN D. WEIR
BY
ATTORNEY

United States Patent Office 3,282,110
Patented Nov. 1, 1966

3,282,110
PRESSURE RESPONSIVE DEVICE
John D. Weir, Huntington, N.Y., assignor to Sperry Rand Corporation, Great Neck, N.Y., a corporation of Delaware
Filed Nov. 29, 1961, Ser. No. 155,580
2 Claims. (Cl. 73—398)

This invention relates to sensitive pressure responsive devices primarily designed for controlling and/or measuring the altitude or air speed of an airplane. If used for the former purpose, the aneroid barometric unit, also referred to as the bellows, is evacuated and sealed so that it expands or tends to expand with increasing altitude while if used as an air speed responsive device, the exterior or one part of the unit is usually connected to a pitot tube or other air speed responsive device and the interior or other part of the unit to static pressure.

Many features of the invention apply to both types of instruments but in the description that follows the invention is shown and described as an altitude responsive device. In instruments of this type it is necessary that they have high resolution and accuracy over a large range of altitudes. Further, the output signal should be independent of external accelerations that may act upon the sensitive portions of the pressure responsive bellows.

Prior art devices now being utilized to measure altitude and/or air speed have a fundamental problem related to their ability to provide large output displacements that can be used to drive output transducers such as synchros, potentiometers, digital encoders, or the like. The limitations of prior art devices require that step-up gearing be employed in order to obtain sufficient resolution of the output, e.g., present output rotations are in the order of 30° from the basic pressure sensor while the present invention has an output rotation of approximately 300° or greater as will be described thus providing an improvement of at least 10 to 1. Step-up gearing has a major difficulty since it multiplies errors. For example, in a 100 to 1 step-up gear arrangement, a 1-second error in the first stage of gearing will become a 100-second error at the output. These errors are caused by manufacturing deficiencies in the gear teeth shape, backlash in the gearing, and loading of the gearing by the backlash take-up means.

The present invention further provides an easy and convenient means for separating the output rotation or signal from the driving mechanism gearing. Another feature of this design is that it provides a simple means for converting a linear motion to a rotary motion without backlash slip or friction, and, at the same time, provides a large rotary output. Because of this large output motion, the output signal can be:
 (1) Measured directly from this shaft position;
 (2) Cams and followers can be used directly to provide shaped outputs which are required to convert pressure into altitude information; and
 (3) The sensitivity of the device can be varied conveniently by varying the driven or driving diameters of the output drives and additional stage drive mechanism.

A related problem that this invention solves is that present transducers use high stress levels in their resilient force restoring means in order to obtain reasonable output rotations. This causes problems in the spring characteristics such as drift, creep, fatigue, and hysteresis. The subject device lessens the need for having highly stressed spring members because large rotational outputs are available without it.

It is the object of the present invention to provide an improved pressure responsive device that produces an extremely accurate output signal over a wide pressure range.

This and other objects are accomplished by utilizing a force balance type of pressure responsive device which provides for high accuracy over a wide pressure range and is not critically dependent upon the bellows displacement characteristics. The force balance principle minimizes the hysteresis and creep principles inherent in pressure responsive devices which use displacement type bellows since the present invention produces a force rather than a displacement and the bellows is maintained at a substantially constant position. The present invention is a linear force balance type of pressure responsive device utilizing helical spring means and a nulling type of servo system for maintaining the bellows in a substantially constant position while providing an output in terms of an unusually large angular rotation of a shaft that is an extremely precise measure of the pressure over a wide range of pressure changes. A compensating accelerometer having a natural frequency that matches the natural frequency of the bellows-spring combination of the pressure sensor is connected to cancel undesirable signals in the output due to accelerations rather than pressure changes.

The invention will now be described with reference to the drawings in which
 FIG. 1 is a perspective schematic diagram of altitude sensing apparatus embodying the invention;
 FIG. 2 is an alternative embodiment utilizing a flexible wire suspension means; and
 FIG. 3 is another alternative embodiment utilizing a step-up strap drive.

The altitude responsive device 10 of FIG. 1 includes a housing 11, shown in phantom, in which an aneroid pressure responsive bellows 12 is mounted. The bellows 12 is fixed to one wall of the housing 11. The bellows 12 is evacuated and responsive to the pressure variations of the input pressure P caused by change in altitude which are introduced into the interior of the housing 11 by means of a pressure inlet conduit 14.

The bellows 12 is connected by a rod 15 to a lower Y-shaped hanger 16. A similarly shaped upper hanger 17 is disposed in spaced relation with respect to the lower hanger 16. Helical restoring springs 20, 21 and 22 are connected between respective extremities of the Y-shaped hangers 16 and 17 to provide a resilient counter force to maintain the device 10 in its null condition in a manner to be explained. The upper hanger 17 is fastened to the lower extremity of a flexible suspension strap 23 which has its other extremity connected to and wound around, i.e., reeved upon, a rotatable shaft 24. The suspension strap 23 may be a thin flexible metallic element or as shown in FIG. 2, it may be a wire 23' or other suitable flexible element. The shaft 24 is mounted for rotation about its longitudinal axis by means of spaced bearings 25 and 26 which in turn are mounted upon and within the housing 11. Extremities 30 and 31 of the shaft 24 extend through respective air tight seals 32 and 33 in the housing 11 for reasons to be explained.

A null sensing E transformer type pick-off 35 has its stator 36 fastened to the housing 11 while its armature 37 is connected to the diaphragm 13, of the bellows 12 by being mounted on the lower hanger 16. The center leg of the stator 36 is energized by an alternating current source 34 in order that movement of the armature 37 with respect to its stator 36 in accordance with pressure variations sensed by the bellows 12 provides a signal from the pick-off 35 having an amplitude and phase representative of the magnitude and direction respectively of the movement of the bellows 12 from a predetermined position. The output windings of the pick-off 35 are connected to a servo means 40 including an amplifier 41, a servomotor 42, a tachometer generator 43, and a high ratio gear train 44.

The amplifier 41 is connected to energize the servomotor 42 which has its output shaft 45 connected to drive a tachometer generator 43. The tachometer generator 43 is connected to provide a rate feedback signal for stabilization purposes to the amplifier 41. The output shaft 45 of the motor 42 is also connected through a high ratio gear train 44 to the extremity 30 to rotate the shaft 24 about its longitudinal axis.

The other extremity 31 of the shaft 24 is connected through a step-up gear train 49 to drive a potentiometer 50. The potentiometer 50 is energized by the A.C. source 34 and provides an output signal on its output terminal 51 representative of the angular position of the shaft 24.

In order to compensate for spurious signals due to the undesirable effects resulting from accelerations as well as vibrations, the pick-off 35 may have connected in series therewith an acceleration responsive device 55 whose output is properly matched to the output of the pick-off 35. The acceleration responsive device 55 may be in the form of an E transformer type accelerometer having an inertial mass or armature 56 mounted on resilient strap springs 57 and 58 which in turn are fastened to the housing 11. The stator 59 of the accelerometer 55 is also mounted on the housing 11 and has its center leg energized by the alternating current source 34. The accelerometer 55 may be of the type disclosed in U.S. Patent 2,883,176 entitled Accelerometer in the name of A. Bernstein issued April 21, 1959. The output windings of the accelerometer 55 are connected in series with the output windings of the pick-off 35.

The accelerometer 55 is designed to have a natural frequency that matches the natural frequency of the diaphragm-spring combination of the pressure sensor, and it is connected to cancel signals in the pressure sensor that are due to acceleration rather than pressure changes. This feature is of particular importance when the device is used as an altitude control device. In an altitude control configuration, the output of the pick-off 35 instead of being connected to the amplifier 41 may be connected to an automatic pilot (not shown) which completes the loop by directing the altitude of the aircraft to correspond with the signal from the pressure sensor and accelerometer pick-offs 35 and 55 respectively.

In operation, with the bellows 12 in a predetermined position in order that the armature 37 of the pick-off 35 is centered with respect to its stator 36, the device 10 is in an equilibrium or null condition with the force applied by the bellows 12 balanced by the force applied by the helical springs 20, 21 and 22. The force F produced by the bellows 12 is equal to the pressure P supplied at the inlet conduit 14 multiplied by the area A of the bellows 12. With the armature 37 centered, there is no signal at the pick-off 35 and the device 10 remains in equilibrium.

As the pressure P increases, a force is exerted by the bellows 12 in a downward direction as viewed in the drawing thereby disturbing the existing equilibrium by also moving the armature 37 downward relative to stator 36 and creating an output signal from the pick-off 35 proportional to P. The signal from the pick-off 35 is amplified in the amplifier 41 and energizes the servomotor 42 to drive the shaft 24. The shaft 24 is rotated in a counterclockwise direction as indicated by the arrow which winds up the strap 23 upon the shaft 24. This causes the helical restoring springs 20, 21 and 22 to stretch until they produce a combined force which is equal and opposite to the force applied by the bellows 12. When these forces are balanced, the armature 37 is again centered and the device 10 is in a new equilibrium position.

The new equilibrium is defined when $F_1 = P_1 A = K_s d$ where K is the total spring rate of the three spring system and $d$ is the spring displacement. Thus, the angular position of the shaft 24 is proportional to the pressure P. The angular position of the shaft 24 is sensed by the potentiometer 50 which provides an output signal representative thereof on its output terminal 51. The angle of rotation of the shaft 24 may be stepped up by means of the step up gear train 49 to obtain the desired signal resolution on the output terminal 51.

In the event of vibrations or accelerations, the inertial mass which forms the armature 56 of the accelerometer 55 senses the accelerations and the accelerometer 55 provides a signal which cancels out the undesirable portion of the signal as sensed by the pick-off 35.

A suspension strap 23 has been shown in FIG. 1 as in general the stress in the strap 24 would be less than that of a flexible wire 23' as shown in FIG. 2. However a strap is limited to less than 360° rotation since overlapping causes the effective diameter of the shaft 24 to change thereby introducing an error into the output signal from the potentiometer 50. In cases where the bellows force or load ($\Delta P \times$Area) is relatively small, a wire suspension is suitable and provides multi-turn capability as shown in FIG. 2.

Although a preferred embodiment of the invention has been shown in FIG. 1, it is obvious that many other changes could be made in the above construction without departing from the true scope of the invention. For example, the armature 37 of the pick-off 35 may be mounted on the connecting rod 15 in lieu of where shown. Further, the connecting rod 15 itself may be a flexible wire as disclosed in U.S. patent application Serial No. 49,365 entitled Pressure Sensor by William J. Topazio and John D. Weir filed August 12, 1960, now Patent No. 3,100,858. In addition, the extremity 31 of the shaft 24 may be directly connected to the potentiometer 50 or to provide an output signal from the potentiometer 50 that is proportional to altitude instead of pressure, conventional altitude-pressure compensation cams (not shown) may be connected between the shaft 24 and the potentiometer 50. Although three helical springs 20, 21, and 22 have been shown in FIG. 1, it is obvious that other resilient means are acceptable.

Referring now to FIG. 3, it will be apparent that the sensitivity of the potentiometer 50 may be easily changed by effectively changing the diameter of the shaft 24 through the use of a strap or wire drive 60.

Further, the armature 37 of the pick-off 35 may be stabilized by means of strap springs which resiliently connect it to the housing 11 in a manner similar to that described with respect to the accelerometer 55.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Pressure responsive apparatus comprising bellows means responsive to pressure variations for providing a force tending to cause a movement thereof in accordance therewith, first pick-off means having one portion thereof connected to said bellows means for providing a signal representative of said movement, a shaft mounted for rotation around its longitudinal axis, flexible suspension strap means having one end thereof directly connected to and wound around said shaft, a plurality of helical springs connected between the other end of said strap means and said one portion of the first pick-off for applying a resilient force varying with the angular position of said shaft for opposing the force provided by said bellows means, servo means responsive to said first pick-off signal for rotating said shaft in a direction tending to eliminate said pick-off signal by means of said springs, said servo means including a servomotor responsive to said first pick-off signal and a high ratio gear train connected between said servomotor and said shaft, and second pick-off means responsive to the rotation of said shaft for providing a measure representative of the pressure applied to said bellows means.

2. Pressure responsive apparatus comprising bellows means responsive to pressure variations for providing a force tending to cause a movement thereof in accordance therewith, first pick-off means having one portion thereof connected to said bellows means for providing a signal representative of said movement, a shaft mounted for rotation around its longitudinal axis, a flexible member having one end thereof directly connected to and wound around said shaft, helical spring means connected between the other end of said flexible member and said one portion of the first pick-off for applying a resilient force varying with the angular position of said shaft for opposing the force provided by said bellows means, servo means responsive to said first pick-off signal for rotating said shaft in a direction tending to eliminate said pick-off signal by means of said spring means, said servo means including a servomotor responsive to said first pick-off signal and a speed reduction means connected between said servomotor and said shaft, and second pick-off means responsive to the rotation of said shaft for providing a measure representative of the pressure applied to said bellows means.

References Cited by the Examiner

UNITED STATES PATENTS

| | | | |
|---|---|---|---|
| 2,568,586 | 9/1951 | Hunt et al. | 73—398 |
| 2,618,157 | 11/1952 | Keeling | 73—386 |
| 2,729,780 | 1/1956 | Miller et al. | 73—386 X |
| 2,751,576 | 6/1956 | Soergel et al. | 73—398 X |
| 2,788,665 | 4/1957 | Wiancko | 73—398 X |
| 2,825,227 | 3/1958 | Sandberg | 73—386 |
| 3,054,699 | 9/1962 | Kischel et al. | 73—386 |
| 3,059,478 | 10/1962 | Coggeshall et al. | 73—398 X |
| 3,068,699 | 12/1962 | Fischer | 73—386 |

RICHARD C. QUEISSER, *Primary Examiner.*

ROBERT EVANS, *Examiner.*

C. A. RUEHL, *Assistant Examiner.*